J. F. CRIGLER.
TRUNK HANDLE.
APPLICATION FILED JUNE 6, 1914.
1,149,634.
Patented Aug. 10, 1915.
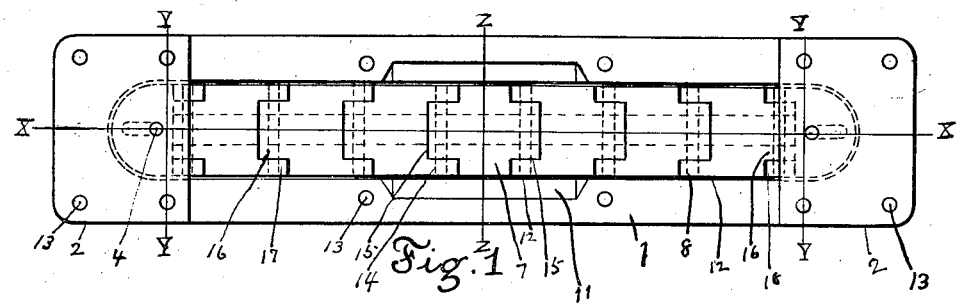
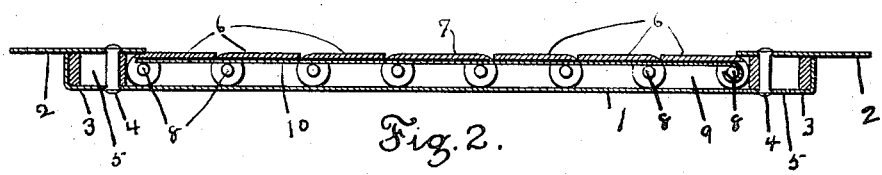
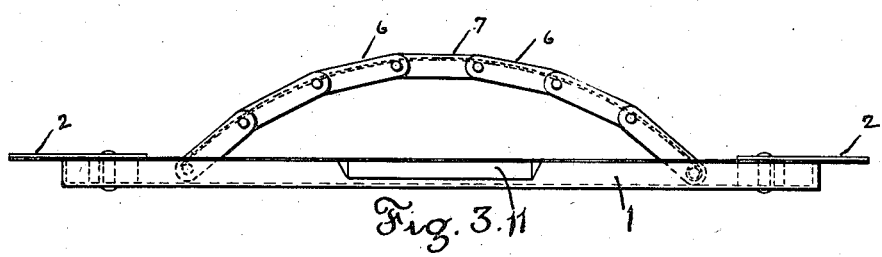
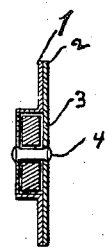  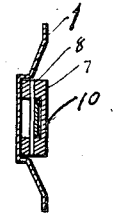  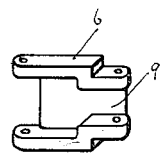
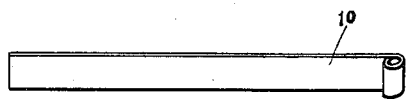
Witnesses:
L. B. Wolf
J. E. Metzger
Inventor:
John F. Crigler

UNITED STATES PATENT OFFICE.

JOHN FIELDING CRIGLER, OF LUTHERVILLE, MARYLAND.

TRUNK-HANDLE.

1,149,634.   Specification of Letters Patent.   Patented Aug. 10, 1915.

Application filed June 6, 1914.   Serial No. 843,389.

*To all whom it may concern:*

Be it known that I, JOHN F. CRIGLER, a citizen of the United States, residing at Lutherville, in the county of Baltimore and State of Maryland, have invented new and useful Improvements in Trunk-Handles, of which the following is a specification.

This invention has reference to improved handles for trunks, boxes, chests and receptacles of like character, the object of which is to provide a handle that will be flush to the wall to which it is secured, and at the same time, will allow said handle to be drawn out when in use. The advantages are as follows: It is automatic, in that when not in use it instantaneously resumes its normal position, flush to the wall to which it is secured, thereby preventing it from being broken or caught by other objects in the handling. A further and chief advantage is when it is in an extended position it is absolutely rigid, and does not cramp or pinch the hands, when the trunk or receptacle is moved from place to place. Furthermore it has no internally projecting parts passing through the walls of the trunk or receptacle into the interior thereof.

A structural embodiment of the present invention is illustrated in the accompanying drawing, in which, Figure 1 is the plan of the handle adapted for being applied to the trunk. Fig. 2 is a section on the line $x$—$x$ of Fig. 1. Fig. 3 is a side elevation of the handle in an extended position. Fig. 4 is a section on the line Y—Y of Fig. 1. Fig. 5 is a section on the line Z—Z of Fig. 1. Fig. 6 is a view of one of the link members of the handle. Fig. 7 is a view of the operating spring.

In referring to the drawing, 1 designates the plate or wall to which the handle is secured, the handle preferably being disposed within a recess 12, whereby when the handle is not in use, it will be flush with the outer wall or receptacle. The plate 1 has members 2 secured at its opposite ends, providing interior spaces, within which are mounted the attaching links 3 of handle proper. Said attaching links 3 have a sliding movement within said interior spaces, controlled or limited by a bolt 4, passing through a longitudinal slot 5 in the attaching links 3.

The handle proper consists of the attaching links 3 just described, a central link member 7, and side link members 6, disposed between the central link member and the attaching links. The central link member 7 has longitudinally extending tongues 14, pivotally disposed within recesses 15 of the adjacent side link members 6. Each side link member 6 has a longitudinally extending tongue 16, at one end, and two longitudinal ears 17 at its opposite end, the ears forming there-between a recess 15 as has been described. Each longitudinal tongue 14 or 16 is disposed within a recess 15 and pivotally mounted upon a pin 8.

The link members 6 and 7 may be made of any suitable metal, having a longitudinal slot 9 extending there-through. In the drawing or device illustrated I have shown link members 6 and 7 as made of pressed or stamped steel, which can easily be produced at a minimum cost.

The numeral 10 designates a flat spring which automatically holds the handle within the recess 12 of the wall or plate 1. The spring 10 is secured at one of its ends to a pin 8, by wrapping it around said pin, the pin 8 extending through a tongue 16 of one of the side link members 6, and through ears 18, of one of the attaching links 3.

In operation, the free end of the spring 10 is disposed between the pins 8 of the central and side link members and the adjacent walls of the longitudinal slot 9, whereby when the handle is in the extended position shown in Fig. 3, the flat spring 10 will be bent in an arc, and will tend to assume a straight position when released.

The numeral 11 is a depression in the wall or plate 1, into which the hand of the operator may be introduced, so as to easily grasp the intermediate portion of the handle.

The plate may be secured to the side of trunk or receptacle by means of rivets or screws 13.

Having thus described my invention, what is claimed is,

1. In a trunk handle, the combination of a handle portion composed of a plurality of link members, and a spring passing through certain of said link members, and adapted to draw said portion in close proximity to the side of the device to which the handle is to be secured.

2. In a trunk handle, the combination of a handle portion composed of a plurality of link members, pivotally connected together, and a flat spring for drawing said portion in close proximity to the side of the device to which the handle is to be secured.

3. In a trunk handle, the combination of a handle portion, composed of a plurality of link members, pivotally connected together, and a spring disposed longitudinally of, and passing through certain of said link members, whereby said portion is drawn in close proximity to the side of the device to which the handle is to be secured.

4. In a trunk handle, the combination of a handle portion composed of a plurality of link members, and a flat spring passing through certain of said link members and adapted to draw said portion in close proximity to the side of the device to which the handle is to be secured.

5. In a trunk handle, the combination of a handle portion composed of a plurality of link members pivotally connected to each other, and a flat spring disposed longitudinally of, and passing through certain of said link members in such a manner as to draw said portion in close proximity to the side of the device to which the handle is to be secured.

6. In a trunk handle, the combination of a handle portion, composed of a plurality of link members, pivots securing said link members to each other, and attaching links, pivotally secured to the ends of said plurality of link members, said attaching links having longitudinal slots disposed therein, and said link members each, having a longitudinal passage disposed therethrough; together with a plate member, pins passing through the plate member and through the slots in the attaching links, and a spring pivotally mounted on one of said pivots and passing through certain of the passages in the said link members, for the purpose described.

7. In a trunk handle, the combination of a handle portion, composed of a plurality of link members, pivots securing said link members to each other, and attaching links, pivotally secured to the ends of the said plurality of link members, said attaching links having longitudinal slots disposed therein, and said link members each, having a longitudinal passage disposed therethrough; together with a plate member, pins passing through the plate member and through the slots in the attaching links, and a flat spring pivotally mounted on one of said pivots and passing through certain of the passages in the said link members for the purpose described.

In testimony that I claim the foregoing as my own I have hereto affixed my signature in the presence of two witnesses.

JOHN FIELDING CRIGLER.

Witnesses:
L. B. WOLF,
F. E. METZGER.